June 25, 1957     J. E. FLORES     2,796,778
DOWELING JIG
Filed Sept. 22, 1955
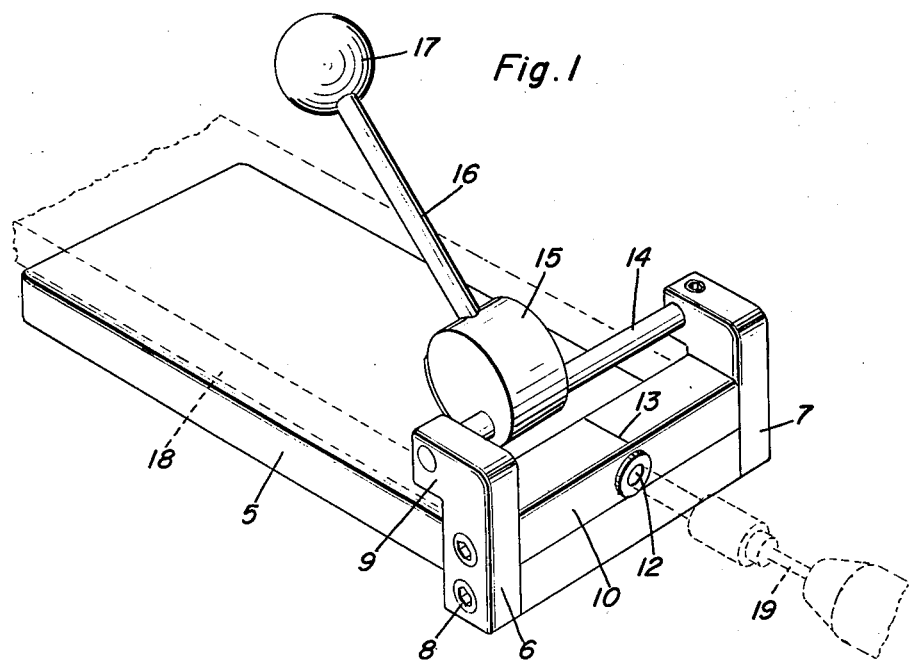
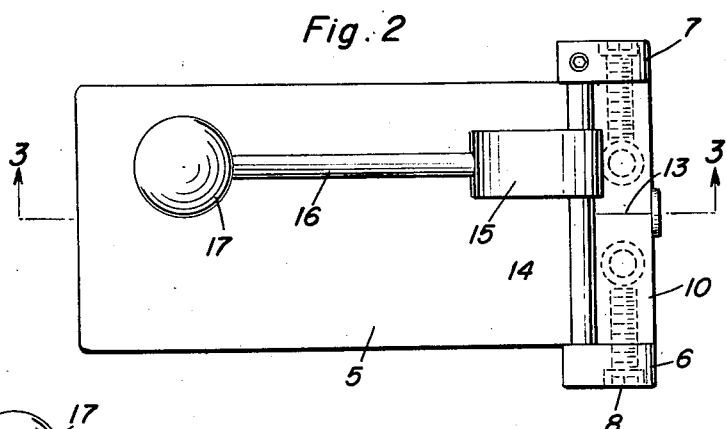
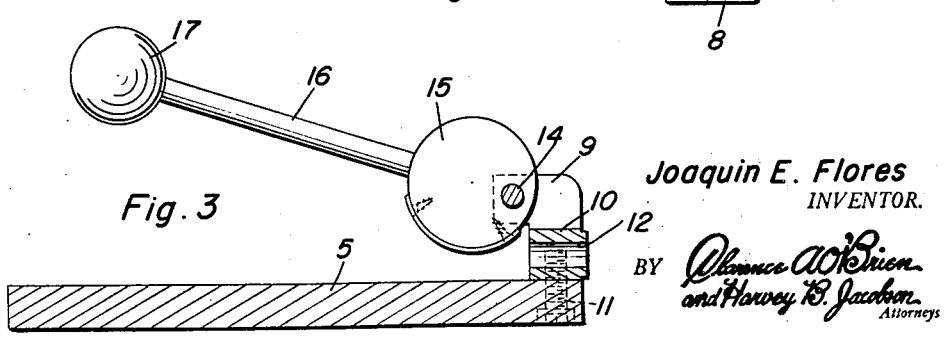
Joaquin E. Flores
INVENTOR.

2,796,778

DOWELING JIG

Joaquin E. Flores, Corona, Calif., assignor of fifty percent to Julian W. Hernandez, Los Angeles, Calif.

Application September 22, 1955, Serial No. 535,923

1 Claim. (Cl. 77—62)

The present invention relates to new and useful improvements in doweling jigs for boring holes in cabinet or furniture lumber for receiving dowel pins to join two pieces of work to each other in edgewise matching relation.

An important object of the invention is to provide a jig in which pieces of the work to be joined are successively clamped for accurately boring dowel pin holes uniformly in the several pieces of work.

Another object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a top plan view; and

Figure 3 is a longitudinal sectional view taken on a line 3—3 of Figure 2.

Referring now to the drawing in detail, wherein for the purpose of illustration I have disclosed a preferred embodiment of my invention, the numeral 5 designates a base plate of rectangular shape and preferably constructed of metal.

A pair of inverted L-shaped posts 6 and 7 are secured to the longitudinal side edges of the base plate at one end of the latter by cap screws 8 to provide rearwardly extending clamping arms at the upper ends of the posts and which are spaced a uniform predetermined distance above the surface of the base plate.

A drill guide plate 10 is secured on top of the base plate 5 between the pair of posts 6 and 7 by socket head cap screws 11 countersunk in the bottom of the base plate. A guide bore 12 is formed in the center of plate 10 to extend from front to rear thereof and the upper surface of the guide plate is marked with a centering line 13 to mark the longitudinal axis of the bore.

A clamp supporting bar 14 is secured at its end portions in the arms 9 of posts 6 and 7 and a clamping disk 15 is eccentrically pivoted and is also slidably mounted on the bar between the posts and is provided with a handle 16 which projects radially from the periphery of the disk at a point substantially diametrically opposite to the pivot thereof. The outer end of the handle is formed with a hand gripping knob.

In the operation of the jig, the pieces of work to be joined are first matched and marked on top at the point the dowel is to be inserted in their abutting edges and each piece is then successively placed on the base plate 5, as shown by dotted lines at 18 in Figure 1, and with the marked edge of the work positioned under the arms 6 and 7 and abutting the guide plate 10 and with the mark on the work aligned with the mark 13 on the guide plate. The handle 16 is then swung downwardly to clamp disk 15 with the work for firmly clamping the work on the jig.

A drill 19 is then inserted in the guide bore 12 to bore a hole in the edge of the first piece of work and the latter is then removed and the second piece of work clamped on the jig and the operation repeated. The two pieces of work are then bored with aligned openings at their matched edges to be joined by a dowel pin in the usual manner.

The lower portion of the periphery of disk 15 is provided with a leather facing 20 to avoid marring the finish of the work.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention claimed.

What is claimed as new is as follows:

A doweling jig comprising an elongated base plate, said base plate including side surfaces, a pair of upstanding posts secured to said side surfaces at one end of said base plate, said posts being transversely aligned and having upper ends in the form of rearwardly projecting arms, a transverse guide overlying said base plate at said one end, means securing said transverse guide to said posts, said transverse guide presenting a surface for abutment by a work piece to be drilled, a shaft extending between said arms, a clamp pivotally and slidably supported on said shaft, said clamp including an elongated handle and an eccentric clamping portion, said eccentric clamping portion being engageable with a work piece for clamping the work piece to said base plate, said guide having a central longitudinal bore, a replaceable drill guide disposed in said bore, and a guide mark on the upper surface of said guide indicating the longitudinal axis of the bore to facilitate aligning the work piece for drilling.

References Cited in the file of this patent

UNITED STATES PATENTS

| 104,001 | Evarts | June 7, 1870 |
| 809,069 | Lovett | Jan. 2, 1906 |